United States Patent [19]

Dettloff et al.

[11] Patent Number: 4,777,091
[45] Date of Patent: Oct. 11, 1988

[54] METAL SUBSTRATES TREATED WITH AMINOPHOSPHONIC ACID COMPOUNDS AND PRODUCTS RESULTING FROM COATING SUCH SUBSTRATES

[75] Inventors: Marvin L. Dettloff; Michael B. Cavitt, both of Lake Jackson; David A. Wilson, Richwood, all of Tex.

[73] Assignee: The Dow Chemical Company, Midland, Mich.

[21] Appl. No.: 43,528

[22] Filed: Apr. 28, 1987

[51] Int. Cl.$^4$ .................. B32B 15/08; B32B 27/06; C23F 7/06
[52] U.S. Cl. .................................. 428/418; 428/462; 428/323; 428/419; 428/500; 148/251; 148/257
[58] Field of Search ............... 428/462, 418, 419, 500; 148/6.15 R

[56] References Cited

U.S. PATENT DOCUMENTS

| | | |
|---|---|---|
| 3,634,146 | 1/1972 | Wystrach ..................... 148/6.15 R |
| 3,900,370 | 8/1975 | Germacheid et al. ............ 148/6.27 |
| 4,308,079 | 12/1961 | Venables et al. ............. 148/6.15 R |
| 4,362,853 | 12/1982 | Demmer ..................... 525/533 |
| 4,540,637 | 9/1985 | Geary et al. ................. 428/418 |
| 4,560,732 | 12/1985 | Kojo et al. .................. 428/418 |
| 4,702,962 | 10/1987 | Kojo et al. .................. 428/418 |

Primary Examiner—P. C. Ives

[57] ABSTRACT

Substrates such as steel or galavanized steel are treated with aminophosphonic acid compounds so as to permit better adhesion of aromatic polyether based coating formulations such as phenoxy resins.

6 Claims, No Drawings

METAL SUBSTRATES TREATED WITH AMINOPHOSPHONIC ACID COMPOUNDS AND PRODUCTS RESULTING FROM COATING SUCH SUBSTRATES

FIELD OF THE INVENTION

The present invention concerns treated metal substrates and products resulting from coating such substrates.

BACKGROUND OF THE INVENTION

The adhesion of coatings to various metal substrates is usually enhanced by treating the surface of the metal prior to coating the metal with coating compositions or adhesive compositions.

It would be desirable to have alternate means for treating metal substrates prior to coating such substrates.

SUMMARY OF THE INVENTION

The present invention pertains to a method for treating steel or galvanized metal substrates which method comprises contacting the surface of said substrate with a composition comprising at least one aminophosphonic acid.

The present invention also pertains to the steel or galvanized metal substrates which have been treated by the aforementioned method.

The present invention also pertains to products resulting from coating the above treated substrates with a phenoxy resin.

The present invention provides a method for treating steel and galvanized metal substrates.

DETAILED DESCRIPTION OF THE INVENTION

The method of the present invention is easily carried out by dissolving or dispersing the aminophosphonic acid compound in a suitable dispersant or solvent and applying the resultant dispersion or solution by any suitable means to the substrate to be treated.

Suitable dispersants or solvents which can be employed to disperse or dissolve the aminophosphonic acid compounds include, for example, water, methanol, combinations thereof and the like.

The concentration of the aminophosphonic acid compound in the dispersant or solvent is usually from about 0.1 to about 20, suitably from about 0.1 to about 15, more suitably from about 0.5 to about 5 percent by weight based upon the combined weight of the dispersant or solvent and the aminophosphonic acid compound. When the concentration is below about 0.1 weight percent, or above about 20 weight percent, loss of adhesion occurs.

The dispersion or solution of the aminophosphonic acid compound can be applied to the substrate by dipping, spraying, roller coating and the like.

The dispersion or solution of the aminophosphonic acid compound can be applied suitably at temperatures of from about 15° C. to about 50° C. The time employed is that which is required to dissolve or disperse or blend the components.

Suitable aminophosphonic acids which can be employed herein include, for example, those represented by the following Formulas I and II

FORMULA I

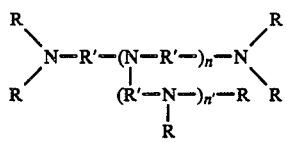

FORMULA II wherein each R is independently hydrogen or the group represented by the following Formula III

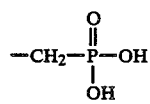

FORMULA III each R' is independently a divalent hydrocarbon group having from 2 to about 10 carbon atoms; each n and n' independently has a value from zero to about 5 and wherein at least one of the R groups within each formula is a group represented by Formula III.

Particularly suitable aminophosphonic acids include, for example, nitrilodi(methylenephosphonic acid), nitroilotris(methylenephosphonic acid), ethylenediaminemono(methylenephosphonic acid), ethylenediaminedi(methylenephosphonic acid), ethylenediaminetri(methylenephosphonic acid), ethylenediaminetetra(methylenephosphonic acid), propylenediaminemono(methylenephosphonic acid), propylenediaminedi(methylenephosphonic acid), propylenediaminetri(methylenephosphonic acid), propylenediaminetetra(methylenephosphonic acid), hexanediaminemono(methylenephosphonic acid), hexanediaminedi(methylenephosphonic acid), hexanediaminetri(methylenephosphonic acid), hexanediaminetetra(methylenephosphonic acid), combinations thereof and the like. Also suitable are those phosphonic acid compounds based on polyalkylenepolyamines such as, for example, mono(methylenephosphonic acid) of diethylenetriamine, di(methylenephosphonic acid) of diethylenetriamine, tri(methylenephosphonic acid) of diethylenetriamine, tetra(methylenephosphonic acid) of diethylenetriamine, penta(methylenephosphonic acid) of diethylenetriamine, mono(-methylenephosphonic acid) of triethylenetetramine, di(methylenephosphonic acid) of triethylenetetramine, tri(methylenephosphonic acid) of triethylenetetramine, tetra(methylenephosphonic acid) of triethylenetetramine, penta(methylenephosphonic acid) of triethylenetetramine, hexa(methylenephosphonic acid) of triethylenetetramine, combinations thereof and the like.

While some aminophosphonic acids employed in the present invention are available commercially, other aminophosphonic acids can be prepared by methods disclosed in the literature such as that disclosed by K. Moedritzer and R. R. Irani in *J. Org. Chem.*, 31, 1603–1607 (1966) and that disclosed by G. Schwarzenbach, W. Biedermann and F. Bangerter in *Helv. Chim. Acta.*, 29, 811, 1946, which are incorporated herein by reference.

The substrates which can be treated by the method of the present invention include, steel and any galvanized metal such as, for example, galvanized steel, and the like. The metal can be galvanized by any suitable galvanizing technique such as, for example, hot dipping, electroplating, and the like.

The substrates which are treated by the method of the present invention can be coated with coating and/or paint compositions or formulations having a polyether resin base.

Suitable aromatic polyether resins which can be employed as the base for the coating or paint formulations or compositions include, for example, the relatively high molecular weight solid aromatic epoxy resins and the phenoxy resins. These resins have a weight average molecular weight of at least about 3,400, suitably at least about 10,000, more suitably in the range of from about 15,000 to about 60,000, most suitably in the range of from about 20,000 to about 50,000. These resins can be terminated in either a glycidyl ether group or a phenolic hydroxyl group. They are readily prepared by reacting a diglycidyl ether of a dihydric phenol with a dihydric phenol which can be the same or different from the dihydric phenol of the aforesaid diglycidyl ether in ratios which are calculated to provide the resin with the desired molecular weight. The weight average molecular weight is that obtained on standard gel permeation chromatographic instruments employing as a standard a diglycidyl ether of bisphenol A having an epoxide equivalent weight of 875 to 975.

Suitable aromatic polyether resins include, for example, those represented by the following Formulas IV and V

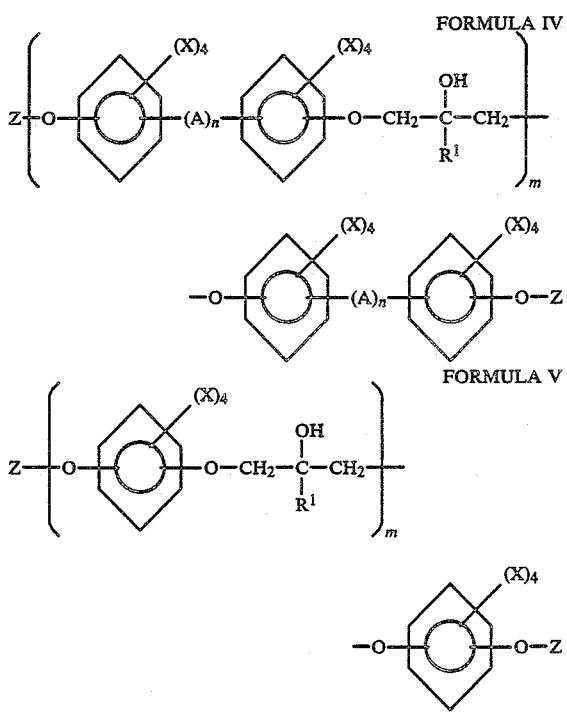

wherein each A is independently a divalent hydrocarbyl group having from 1 to about 12, suitably from 1 to about 6, more suitably from 1 to about 4, carbon atoms, —S—, —S—S—, —SO—, —SO$_2$—, —O— or —CO—; each $R^1$ is independently hydrogen or an alkyl group having from 1 to about 4 carbon atoms; each X is independently hydrogen, a monovalent hydrocarbyl or hydrocarbyloxy group having from 1 to about 12, suitably from 1 to about 6, more suitably from 1 to about 4, carbon atoms or a halogen such as chlorine, bromine or fluorine; each Z is independently hydrogen or a glycidyl group represented by the following Formula VI

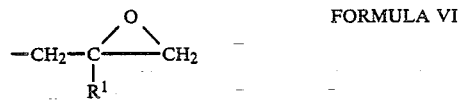

FORMULA VI n has a value of zero or 1; and m has a value of at least about 11, suitably from about 34 to about 210, more suitably from about 52 to about 192 and most suitably from about 69 to about 175. Particularly suitable aromatic polyether resins include those prepared from a diglycidyl ether of bisphenol A and bisphenol A.

The polyether resins can be dissolved in an inert solvent or dispersed in an inert diluent, if desired. Suitable inert solvents and diluents or dispersants include, for example, glycol ethers, glycol ether esters, ketones, aromatic hydrocarbons, aliphatic hydrocarbons, amides, combinations thereof and the like. Particularly suitable are, acetone, methyl ethyl ketone, methyl isobutyl ketone, ethylene glycol methyl ether, ethylene glycol ethyl ether, ethylene glycol n-butyl ether, ethylene glycol phenyl ether, diethylene glycol methyl ether, diethylene glycol ethyl ether, diethylene glycol n-butyl ether, propylene glycol methyl ether, propylene glycol ethyl ether, propylene glycol n-butyl ether, propylene glycol phenyl ether, dipropylene glycol methyl ether, dipropylene glycol ethyl ether, dipropylene glycol n-butyl ether, hexane, heptane, octane, nonane, decane, toluene, xylene, dimethylformamide, ethylene glycol methyl ether acetate, ethylene glycol ethyl ether acetate, combinations thereof and the like.

The polyether resins can be mixed with curing agents which react with the aliphatic hydroxyl groups in the backbone of the aromatic polyether resins, if desired. Suitable such curing agents include, for example, urea-aldehyde resins, melamine-aldehyde resins, bisphenol-aldehyde resins, alkoxylated urea-aldehyde resins, alkoxylated melamine-aldehyde resins, alkoxylated bisphenol-aldehyde resis, polyisocyanates, blocked polyisocyanates, combinations thereof and the like. These curing agents are employed in amounts ranging from about 1 to about 40, suitably from about 1 to about 30, more suitably from about 2 to about 20 parts of curing agent per 100 parts by weight of polyether resin.

Other materials which can be mixed with the polyether resins include, dyes, pigments, fillers, surfactants, flow control agents, leveling agents, flame retardants, thickeners, combinations thereof and the like. Such additives are employed in functionally equivalent amounts e.g. dyes and pigments are employed in amounts which provide the resultant mixture with the desired color. Flow and leveling agents are employed in amounts which provide the resultant mixture with the desired amount of flow and leveling and so on for the other additives. However, these additives are usually employed in amounts of from about 5 to about 80, suitably from about 10 to about 70, more suitably from about 20 to about 70 parts by weight based upon the combined weight of polyether resin and curing agent.

The paint or coating compositions or formulations can be applied to the substrates which have been treated by the method of the present invention by any of the known means of application. Those which are applied in the absence of a solvent are solid and may be comminuted into powder form by any suitable means such as by grinding, and the like. The powdered formulations can then be applied to the substrates by any suitable technique such as, for example, fluidized bed coating, melting the powders and applying the melted formulation to the substrate by means of a draw bar, and the like.

The formulations can be dissolved or dispersed in inert solvents or diluents and applied to a substrate by any suitable method such as spraying, dipping, means of a draw bar, and the like.

The compositions can be applied to the treated substrates at any temperature from about ambient in the instance of solution or dispersed coatings to a temperature which is above the melting or flowing temperature of the coating formulation to a temperature just below the decomposition temperature of the components of the coating formulation in the instance of solvent-free or diluent-free coatings. Particularly suitable application temperatures include, for example, ambient (about 23° C.) to about 250° C., suitably from about 23° C. to about 200° C., more suitably from about 23° C. to about 150° C.

The following examples are illustrative of the invention but are not to be construed as to limiting the scope thereof.

The following compounds are employed in the examples.

AMINO A is ethylenediaminedi(methylenephosphonic acid).

AMINO B is nitrilotris(methylenephosphonic acid) dissolved in water at 50 weight percent.

AMINO C is ethylenediaminetetra(methylenephosphonic acid).

POLYETHER RESIN is a diglycidyl ether of bisphenol A having a weight average molecular weight of 40,378.

The following substrate materials are employed in the examples.

STEEL is unpolished, untreated cold rolled steel 24 gauge (0.63 mm) 12 in.×4 in. (304.8 mm×101.6 mm) panels.

GALVANIZED STEEL is unpolished steel 24 gauge (0.63 mm) 12 in.×4 in. (304.8 mm×101.6 mm) panels. which are galvanized by the electrolytic method.

The following tests are employed in the examples.

CROSS-HATCH TEST: After the panels are coated and the solvent removed, the coating is cut in such a manner that 100 small blocks are made. This is accomplished by cutting horizontal lines and vertical lines measuring about 1.5×1.5 cm. Onto this cross-hatch pattern is placed acetic acid for a period of time, then wiped off and washed with water. For the STEEL panels, the contact time with the acetic acid is 2 minutes and for the STEEL AND GALVANIZED STEEL panels, the contact time with acetic acid is 10 minutes. The panel is allowed to air dry for 2 minutes, then the adhesion is tested by applying tape to the cross-hatch, then removing the tape in one quick movement. The amount of uncoated blocks of coating which is removed by the tape is recorded. The lower the amount of coating removed by the tape the better the adhesion of the coating.

COATING METHOD: The panels are coated with the coating formulations using a number 28 draw down bar. The panels are prebaked at 60° C. for 0.083 hour, then placed into an oven at 200° C. for 0.5 hour after the coating formulation is applied.

EXAMPLE 1

A mixture is prepared by mixing 3.37 gms of AMINO A in 671.6 gms of water. The solution is then placed into a glass tray and the STEEL and GALVANIZED STEEL panels are immersed into this solution for 1 hour at ambient temperature (23° C.). At the end of this time, the panels are removed, washed with water and then air dried. The panels are then coated with the POLYETHER RESIN and cured.

EXAMPLE 2

A mixture is prepared by mixing 8 gms of AMINO B in 792 gms of water. The solution is then placed into a glass tray and the STEEL and GALVANIZED STEEL panels are immersed into this solution for 1 hour at ambient temperature (23° C.). At the end of this time, the panels are removed, washed with water and then air dried. The panels are then coated with the POLYETHER RESIN and cured.

EXAMPLE 3

A mixture is prepared by mixing 3.15 gms of AMINO C in 626.8 gms of water. The solution is then placed into a glass tray and the STEEL and GALVANIZED STEEL panels are immersed into this solution for 1 hour at ambient temperature (23° C.). At the end of this time, the panels are removed, washed with water and then air dried. The panels are then coated with the POLYETHER RESIN and cured.

Each of the coated panels are subjected to the cross-hatch test. The results are given in the table.

COMPARATIVE EXPERIMENT A

Panels are coated with the POLYETHER RESIN alone. The coated panels are baked by the same procedure as are the coatings of the examples. The results are given in the table.

| TEST NO. | EXAMPLE OR COMP. EXPT. DESIG | AMINO COMPOUND | SUBSTRATE | CROSS-HATCH TEST % of Coating Removed |
|---|---|---|---|---|
| A | A* | none | steel | 35 |
| B | 1 | Amino A | steel | 0 |
| C | 2 | Amino B | steel | 22 |
| D | 3 | Amino C | steel | 0 |
| E | A* | none | galvanized steel | 96 |
| F | 1 | Amino A | galvanized steel | 85 |
| G | 2 | Amino B | galvanized steel | 100 |
| H | 3 | Amino C | galvanized steel | 75 |

*Not an example of the present invention.

What is claimed is:

1. A steel or galvanized metal substrate which has been treated by contacting the surface of said substrate with a solution or dispersion of at least one aminophosphonic acid compound and which thus treated surface has been coated with an aromatic polyether resin which has a weight average molecular weight of at least about 3,400 and is represented by the following Formulas IV or V

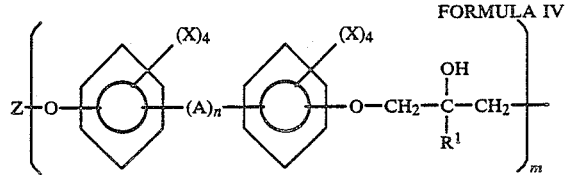
FORMULA IV

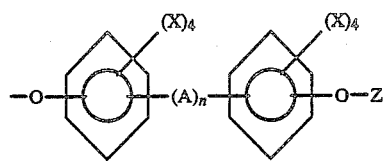

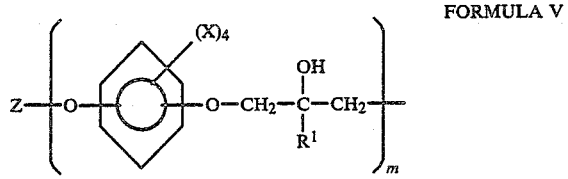
FORMULA V

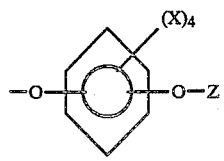

wherein each A is independently a divalent hydrocarbyl group having from 1 to about 12 carbon atoms, —S—, —S—S—, —SO—, —SO$_2$—, —O— or —CO—; each R$^1$ is independently hydrogen or an alkyl group having from 1 to about 4 carbon atoms; each X is independently hydrogen, a monovalent hydrocarbyl or hydrocarbyloxy group having from 1 to about 12 carbon atoms or a halogen; each Z is independently hydrogen or a glycidyl group represented by Formula VI

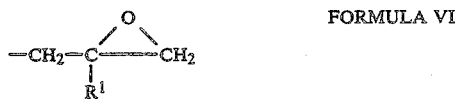
FORMULA VI n has a value of zero or 1 and m has a value of at least about 11.

2. A substrate of claim 1 wherein
(i) the concentration of aminophosphonic acid compound in said solution or dispersion is from about 0.1 to about 20 percent by weight;
(ii) the thus treated substrate is subjected to a temperature of from about 23° C. to about 250° C. for from about 0.15 to about 5 hours; and
(iii) said aromatic polyether resin has a weight average molecular weight of at least about 10,000 and is represented by formula IV wherein each A is independently a divalent hydrocarbyl group having from 1 to about 6 carbon atoms, —S—, —S—S—, —SO—, —SO$_2$—, —O— or —CO—; each R$^1$ is independently hydrogen or an alkyl group having from 1 to about 4 carbon atoms; each X is independently hydrogen, a monovalent hydrocarbyl or hydrocarbyloxy group having from 1 to about 6 carbon atoms or a halogen; n has a value of 1 and m has a value of from about 34 to about 210.

3. A substrate of claim 1 wherein
(i) the concentration of aminophosphonic acid compound in said solution or dispersion is from about 0.1 to about 15 percent by weight;
(ii) the thus treated substrate is subjected to a temperature of from about 23° C. to about 200° C. for from about 0.2 to about 3 hours;
(iii) said substrate is steel or galvanized steel; and
(iv) said aromatic polyether resin has a weight average molecular weight of from about 15,000 to about 60,000 and wherein each A is independently a divalent hydrocarbyl group having from 1 to about 4 carbon atoms; each R$^1$ is hydrogen; each X is independently hydrogen, a monovalent hydrocarbyl or hydrocarbyloxy group having from 1 to about 4 carbon atoms or a halogen; and m has a value of from about 52 to about 192.

4. A substrate of claim 1 wherein
(i) the concentration of aminophosphonic acid compound in said solution or dispersion is from about 0.5 to about 5 percent by weight;
(ii) the thus treated substrate is subjected to a temperature of from about 23° C. to about 150° C. for from about 0.25 to about 1 hour;
(iii) said substrate is steel or galvanized steel; and
(iv) said aromatic polyether resin has a weight average molecular weight of from about 20,000 to about 50,000; m has a value of from about 69 to about 175; A is an isopropylidene group and each X is hydrogen.

5. A substrate of claim 1, 2, 3 or 4 wherein said aminophosphonic acid is represented by the following Formulas I or II

FORMULA I

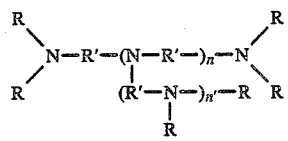
FORMULA II wherein each R is independently hydrogen or the group represented by the following Formula III

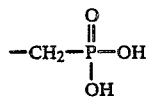
FORMULA III each R' is independently a divalent hydrocarbon group having from 2 to about 10 carbon atoms; n and n' each independently has a value from zero to about 5; and at least one of the R groups in each formula is a group represented by the Formula III.

6. A substrate of claim 5 wherein said aminophosphonic acid is nitrilotri(methylenephosphonic acid), ethylenediaminedi(methylenephosphonic acid), ethylenediaminetetra(methylenephosphonic acid) or a combination thereof.

* * * * *